April 5, 1960     C. HOWARD, JR     2,931,471

FASTENER AND ITS USE

Filed March 30, 1956

*INVENTOR.*
CARL HOWARD, JR.

2,931,471

Patented Apr. 5, 1960

2,931,471

FASTENER AND ITS USE

Carl Howard, Jr., Cuyahoga Falls, Ohio

Application March 30, 1956, Serial No. 575,212

8 Claims. (Cl. 189—36)

This invention relates to a fastener or clip and its use. It is designed for fastening an object to a slotted support using a bolt, a self-tapping screw, a sheet metal screw or other threaded shank, and particularly for attaching an automobile license plate to the support provided on an automobile. It is used to greatest advantage where there is no access to the rear of the support to which the attachment is to be made.

The clip is formed with portions lying in two substantially parallel planes which are adapted to be located at the front and back of the support. These are referred to herein as the front and back portions of the clip. These portions are flattened against the front and back, respectively, of the support as the bolt, etc. is tightened. The back or body portion of the clip is so narrow that it can be inserted into and through the slot from the front of the support, but so long in one dimension that when rotated after being so inserted, its ends overlie portions of the back of the support adjacent the slot.

There is an aperture in the back or body portion of the clip into which the threaded shank is threaded. This aperture may be threaded or not, depending upon the nature of the threaded shank that is to be used. The front and back portions of the clip are connected by two legs located on opposite sides of the aperture. They are spaced from one another such a distance that when the clip is inserted in a slot, and then rotated, they abut opposite sides of the slot and prevent further rotation of the clip in the slot. By preventing rotation of the clip, the bolt or the like is easily threaded into the aperture. If the thread on the shank is a right-handed thread, as is customary, the legs are attached to the body portion of the clip in positions counter-clockwise from the ends of the clip. For a left-handed shank they will be attached in clockwise positions.

At least a portion of the front portion of the clip overlies the front of the support when the clip is in the aforesaid rotated position. This front portion is preferably in the form of ears that overlie the ends of the back portion of the clip.

The clip is constructed of a plastic material. Untempered spring steel has been found to be particularly satisfactory. When a threaded shank is tightened into a clip in a slotted member, the center part of the back portion of the clip is drawn into the slot and becomes squeezed and distorted, causing its ends to flare outwardly from the support. This distortion of the clip locks it against both the support and the threaded shank. The legs may collapse, and the legs and ears also may bind against the shank. However, the clip is not locked against the threaded shank so tightly that there is any difficulty in removing the bolt or the like, as when the license plate is to be replaced. The distorted clip is then left in the slot, from which it can easily be removed.

In using the clip, it is preferably first threaded on to the bolt or other threaded shank. Then holding the head of the bolt or the like, the clip is turned to the position in which it can be inserted into the slot. Then, while still holding only the head of the bolt, the clip is moved into the slot. The head of the bolt is turned and the license plate or other apertured member is tightened against its support. Thus, there is no necessity for touching the clip, after it is first put on to the bolt. There is no necessity for reaching to the back of the support at any time.

The invention will be further described in connection with the accompanying drawings, in which—

Figure 1:
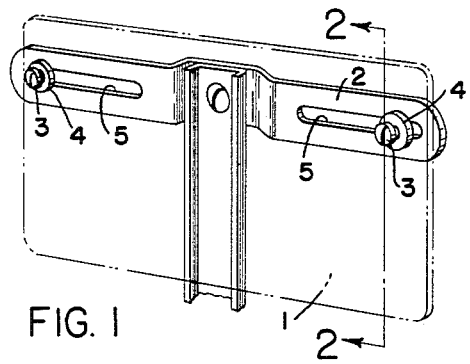
Fig. 1 is an elevation showing the attachment of an automobile license plate (shown in phantom) to a usual support on an automobile.
Figure 2:
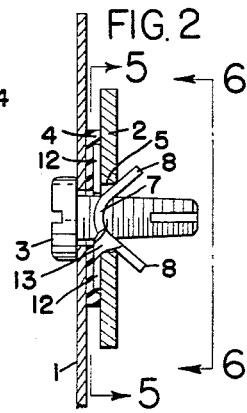
Fig. 2 is a section on the line 2—2 of Fig. 1.

In Fig. 1 the license plate 1 is shown in phantom. It is shown in full lines in Figs. 2, 3, 6 and 7. The license plate is fastened to the slotted support 2 by sheet metal screws 3. It is advantageous to employ a rubber washer 4 behind the license plate, but this is optional. The slot in the support 2 is identified by the numeral 5.

The fastener or clip shown in the drawings is of untempered spring steel. It comprises a body or back portion 7. When the clip is used for attaching a license plate or other member to a support, this body portion in the completed assembly lies at the back of the support. As clearly shown in the various figures, this body portion is narrow enough to be inserted through the slot 5, but when turned the ends 8 of the clip extend beyond the slot and overlie the body of the support adjacent the slot. The distance which the ends 8 extend beyond the respective sides of the slot when the clip is turned to its final position, is preferably the minimum necessary to hold the clip in place so that the clip can be used in a slot in a narrow box channel as well as in a slot in a flat support.

The circular opening 10 may be tapped or its surface may be perfectly smooth depending upon whether a bolt or a self-tapping screw, etc. is to be used in it.

The clip is provided with ears 12 connected to the body portion or back by legs 13. These ears, which constitute the front portion of the clip, lie in a plane which is generally parallel to the plane of the body or back portion 7. They overlie the body portion, and particularly at the ends 8, to insure their being on the opposite side of the support from these ends after the clip has been turned to its final position in the slot. In forming the clip it is possible to turn the ears outwardly instead of inwardly from the legs, but in that case care must be taken that when the clip is rotated to the position shown in Fig. 5 the ears will overlie the edges of the support adjacent the slot.

Figure 4:
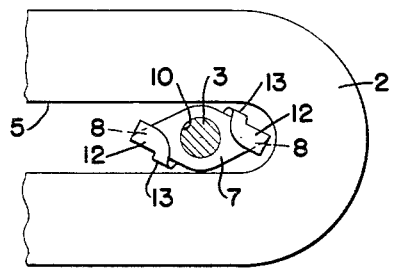
Fig. 4 is a view of the fastener on a screw against the background of the slotted support before the assembly.
Figure 5:
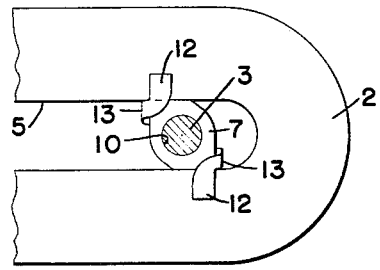
Fig. 5 is a view of the same after the assembly but before the screw is tightened.
Figure 6:
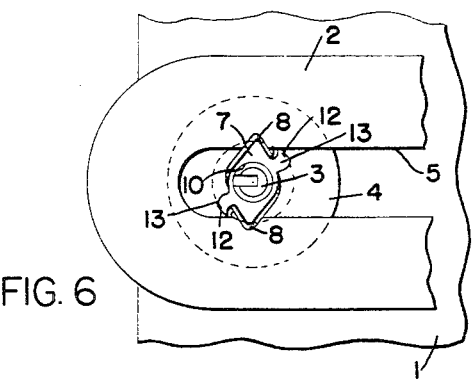
Fig. 6 is a rear view of the same after the assembly.

The legs 13 are so located that after the body or back portion of the clip is inserted through the slot, as in Fig. 4, and the clip is then turned to the position shown in Fig. 5, the legs will abut the edges of the slot and thus prevent the clip from being turned any further in the slot. If the clip is to be used on any right-handed thread these legs are arranged counterclockwise with respect to the ends 8. If they are to be used on a bolt or the like with a left-handed thread, they will be located clockwise with respect to the ends 8.

Figure 3:
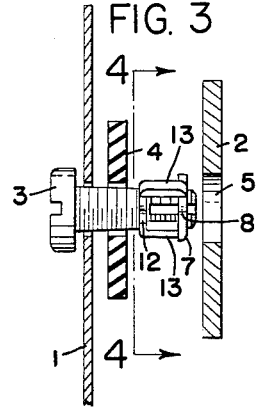
Fig. 3 is a similar section but showing the relation of the parts at the start of the assembly operation.
Figure 7:
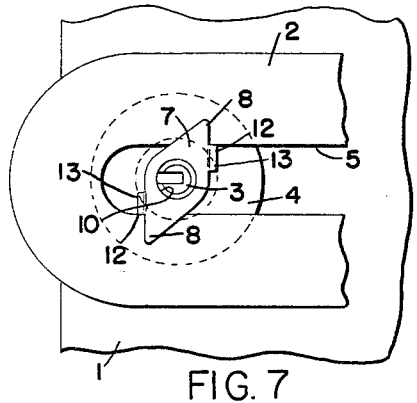
Fig. 7 is a rear view of the same after the fastener has been turned in the slot but before it has been tightened.
Figure 8:
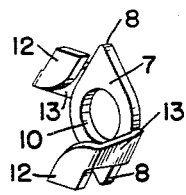
Fig. 8 is a view in perspective of the fastener before use.
Figure 9:
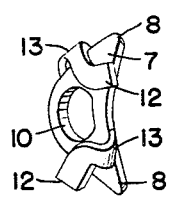
Fig. 9 is a view in perspective of the fastener after use.

A principal advantage in the use of this clip is that it is not necessary to get back of the support in order to use or remove it. It is simply threaded on to the screw or other threaded shank after the screw has been put through the opening in the license plate 1 and before it is inserted in the slot 5 in the support. This is clearly illustrated in Fig. 3. The use of a washer is optional. If a washer is used it is of course next put on the screw before the clip is threaded on to the screw. This is shown in Fig. 3. The clip is turned to such an angle that it will pass through the opening 5. Then by manipulation of the screw while holding its head, the clip is inserted into the slot (as shown in Fig. 4) and then the screw is turned clockwise. This brings the legs 13 against the edges of the slot, as shown in Fig. 5. The ends 8 then overlie the edges of the support adjacent the slot, as shown in Fig. 7. All that is then necessary is to tighten the screw. As the screw is tightened the license plate is drawn to the support.

After the slack has all been taken up the screw is given another partial turn or two. This draws the body portion 7 of the clip into the slot 5 as clearly illustrated in Fig. 2. This causes the ends 8 of the clip to flare outwardly. The legs may collapse and the ears may bind against the screw. This distortion of the clip produces a vise-like grip on the support and binds on the screw so that the screw is positively locked in the clip and will not jar loose.

The grip is not so tight, however, as to prevent the screw from being loosened with a screwdriver. When it is so loosened it can readily be removed without damage to the support. The clip is squeezed in the slot and does not turn with the screw as it is loosened. It, therefore, remains in the slot when the screw is removed. It can easily be dislodged by hitting it with a screwdriver or the like. It is not necessary to have access to the rear of the support in order to remove the clip, or for any other purpose.

The drawings illustrate the preferred form of clip and its preferred use. It can be used for other purposes than to fasten a license plate to a support. The clip must be sufficiently plastic to yield under the pressure applied with a screw or bolt or the like. Ordinarily it is made of metal.

The invention is defined in the claims which follow.

What I claim is:

1. A plastic fastener for attachment of a threaded shank member into a slot in a plate member, which fastener comprises a body portion lying in one plane and two wing members lying in a substantially paralell second plane, the body portion having a circular opening for threaded engagement with the shank member and being elongated with its length greater than the width of said slot but narrow enough to be readily inserted therein, each wing being connected to the body portion by a connecting portion, said connecting portions being united to the narrow portion of the body portion a short distance from the respective ends of the body portion, and being far enough apart to prevent free rotation of the clip in the slot.

2. The fastener of claim 1 made of spring steel.

3. The fastener of claim 1 in which the legs are located a short distance counter-clockwise from the respective ends of the body portion of the clip.

4. A fastener to be used for holding a plate member on a threaded shank member in a slot in a support, the fastener comprising a first portion lying in one plane and ears lying substantially in a second plane parallel to the first plane, an aperture at about the center of the first portion adapted to be threaded on to the shank member, the two portions being joined by two legs which join the portions of the fastener on opposite sides of the aperture, the first portion of the fastener being narrow enough to be passed through said slot but longer than the width of the slot, the legs being attached to the first portion so far apart that they are adapted to abut opposite walls of the slot when the fastener is rotated when the legs are in the slot, the legs being attached to the first portion in a position counter-clockwise from its respective ends, whereby when the fastener is turned clockwise in the slot the legs abut the sides of the slot when said ends of the first portion and the ears overlie opposite surfaces of the support.

5. In the combination of a slotted support, a threaded shank in the slot, and a fastener, the improvement in which the fastener has a flat portion narrow enough to be passed through the slot but longer in one direction with its ends in back of the portion of the support adjacent the slot, the central portion of the fastener is apertured and threaded on to the shank, and there are two ears on the fastener in front of the support and contacting opposite sides of the slot, the fastener being distorted against the shank and locking the shank against rotation therein.

6. In the combination of a plate with two openings therein, a slotted support, two bolts or the like, and two clips with an aperture in each clip, each bolt passing through one aperture in the plate and the aperture in one clip and being bound in the latter aperture, each clip being in a slot in the support with the plate tightened against the support and held by the bolts, the improvement in which a portion of each clip is on each side of the support with the portion on the side farthest from the plate being narrow enough to be passed through the slot but longer in one direction than the slot is wide.

7. The combination of claim 6 in which there is a resilient washer between the plate and each clip.

8. The combination of claim 6 in which the portion of each clip on the side of the support nearest the plate is in the form of two ears, each ear being attached to the balance of the clip by a leg, the ears and legs of both clips being locked against the support and against the shanks of the respective bolts.

References Cited in the file of this patent

UNITED STATES PATENTS

| | | |
|---|---|---|
| 1,668,756 | Borresen | May 8, 1928 |
| 1,792,445 | Price | Feb. 10, 1931 |
| 1,881,836 | Mitchell | Oct. 11, 1932 |
| 2,025,004 | Shearer | Dec. 7, 1935 |
| 2,055,166 | Berry | Sept. 22, 1936 |
| 2,100,041 | Thieler | Nov. 23, 1937 |
| 2,306,975 | Pender | Dec. 29, 1942 |
| 2,567,902 | Bedford | Sept. 11, 1951 |
| 2,596,332 | Flora | May 13, 1952 |